US008584132B2

(12) United States Patent  
Gupta et al.

(10) Patent No.: US 8,584,132 B2
(45) Date of Patent: Nov. 12, 2013

(54) ULTRA-WIDEBAND RADIO CONTROLLER DRIVER (URCD)-PAL INTERFACE

(75) Inventors: Pankaj B. Gupta, Bothell, WA (US); Vivek Gupta, Bothell, WA (US); Randell E. Aull, Kenmore, WA (US); Deng Zhong, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 12/334,087

(22) Filed: Dec. 12, 2008

(65) Prior Publication Data

US 2010/0153973 A1 Jun. 17, 2010

(51) Int. Cl.
*G06F 9/46* (2006.01)
*G06F 15/16* (2006.01)

(52) U.S. Cl.
USPC ........... 718/104; 719/321; 709/230; 370/912; 370/913

(58) Field of Classification Search
None
See application file for complete search history.

(56) References Cited

U.S. PATENT DOCUMENTS

| | | | |
|---|---|---|---|
| 5,768,527 A | 6/1998 | Zhu et al. |
| 6,067,534 A | 5/2000 | Terho et al. |
| 6,141,565 A | 10/2000 | Feuerstein et al. |
| 6,175,856 B1 | 1/2001 | Riddle |
| 7,047,305 B1 | 5/2006 | Brooks et al. |
| 2002/0073238 A1 | 6/2002 | Doron |
| 2002/0136164 A1 | 9/2002 | Fukuda et al. |
| 2002/0141392 A1 | 10/2002 | Tezuka et al. |
| 2003/0152032 A1 | 8/2003 | Yanagihara et al. |
| 2003/0236892 A1 | 12/2003 | Coulombe |
| 2004/0107245 A1 | 6/2004 | Bodnar |
| 2004/0113933 A1 | 6/2004 | Guler |
| 2004/0133701 A1 | 7/2004 | Karaoguz et al. |
| 2004/0253991 A1 | 12/2004 | Azuma |
| 2005/0018768 A1 | 1/2005 | Mabey et al. |
| 2005/0073575 A1 | 4/2005 | Thacher et al. |
| 2005/0273491 A1 | 12/2005 | Meyer et al. |
| 2005/0276255 A1 | 12/2005 | Aiello et al. |
| 2006/0079209 A1 | 4/2006 | Oda |

(Continued)

FOREIGN PATENT DOCUMENTS

| | | |
|---|---|---|
| EP | 1463323 | 9/2004 |
| JP | 11215481 | 8/1999 |

(Continued)

OTHER PUBLICATIONS

"Wireless Host Controller Interface Specification for Certified Wireless Universal Serial Bus: Certified Wireless USB 1.0". Intel Corporation. Jun. 16, 2006.*

(Continued)

*Primary Examiner* — Emerson Puente
*Assistant Examiner* — Adam Lee
(74) *Attorney, Agent, or Firm* — Wolfe-SBMC

(57) ABSTRACT

Various embodiments provide a two-way interface between a URC driver (URCD) and various Protocol Adaption Layer (PAL) drivers. The two-way interface can enable bandwidth to be shared and managed among multiple different PALs. The two-way interface can also be used to implement common radio functionality such as beaconing, channel selection, and address conflict resolution. In at least some embodiments, the two-way interface can be utilized for power management to place PALs in lower power states to conserve power and to support remote wake-up functionality. Further, at least some embodiments can enable vendor-specific PALs to interact with vendor-specific hardware.

20 Claims, 5 Drawing Sheets

(56) References Cited

U.S. PATENT DOCUMENTS

| | | | |
|---|---|---|---|
| 2007/0002840 | A1 | 1/2007 | Song et al. |
| 2007/0066314 | A1 | 3/2007 | Sherman et al. |
| 2007/0174489 | A1 | 7/2007 | Iwabuchi |
| 2007/0174881 | A1 | 7/2007 | Idehara et al. |
| 2007/0248114 | A1 | 10/2007 | Jia et al. |
| 2007/0271358 | A1 | 11/2007 | Gaddy |
| 2008/0165895 | A1 | 7/2008 | Lesser et al. |
| 2008/0225750 | A1 | 9/2008 | Jefremov |
| 2008/0225844 | A1 | 9/2008 | Jefremov |
| 2009/0198859 | A1* | 8/2009 | Orishko et al. ............... 710/313 |
| 2009/0234919 | A1 | 9/2009 | Jefremov et al. |

FOREIGN PATENT DOCUMENTS

| | | |
|---|---|---|
| WO | WO-9722201 | 6/1997 |
| WO | WO-2005002261 | 1/2005 |
| WO | WO-2005009019 | 1/2005 |
| WO | WO-2008027724 | 3/2008 |
| WO | WO-2008110871 | 9/2008 |
| WO | WO-2008110930 | 9/2008 |

OTHER PUBLICATIONS

Bhesania, Fred et al. "UltraWide Band Architecture for Windows". Microsoft PowerPoint Presentation dated 2006.*

Lee, Seung-sik et al. A WiMedia UWB Transceiver for 4-HD Channel Streaming. IEEE Transactions on Consumer Electronis, vol. 53, No. 2, May 2007.*

Mayerhofer, Michael B., "Introduction to Wireless USB—An embedded perspective", *Streamunlimited Engineering GmbH Gutheil-Schoder-Gasse 10*, A-1102 Vienna, Austria, (Sep. 11, 2005),1-10.

Perez-Gonzalez, Inaky "Proceedings of the Linux Symposium", *Open source Technology Center, Intel Corporation*, (Jun. 27-30, 2007),1-10.

"Ultra-Wideband (UWB Technology)", *Copyright 2005 Intel Corporation. All rights reserved.*, Enabling high-speed wireless personal area networks. (2005), 1-8.

Chiani, et al., "Ultra Wide Bandwidth communications towards Cognitive Radio", *EMC Europe Workshop 2005—Rome, Italy*, (2005),1-4.

"Support UWB & WUSB on OpenSolaris", *Version 1.0*, WUSB (Wireless USB) is a new technology from, the Wireless Universal Serial Bus Specification Revision 1.0 released at May 12, 2005. WUSB chooses UWB(Ultra Wide Band), from WiMedia Alliance, as its radio module.,(May 12, 2005),1-11.

"Ultra-Wideband (UWB) Technology" *Copyright 2005 Intel Corporation.*, (2005),1-4.

"Final Office Action", U.S. Appl. No. 12/004,457, (Mar. 1, 2012), 29 pages.

"International Search Report and Written Opinion", Application No. PCT/EP2009/052916, (Jul. 10, 2009), 14 pages.

"International Search Report and Written Opinion", Application No. PCT/IB2007/004510, (Sep. 5, 2008), 12 pages.

"International Search Report", PCT/IB2008/001353, (Sep. 12, 2008), 4 pages.

"Non-Final Office Action", U.S. Appl. No. 12/004,457, (Aug. 1, 2011), 21 pages.

"Written Opinion", Application No. PCT/IB2008/001353, (Sep. 12, 2008), 8 pages.

Sato, Jun et al., "Compressed Video Transmission Protocol Considering Dynamic QoS Control", *Architecture and OS Support for Multimedia Applications/Flexible Communication Systems/Wireless Networks and Mobile Computing, 1998 ICPP Workshops*, (Jan. 1998), pp. 95-104.

\* cited by examiner

ULTRA-WIDEBAND RADIO CONTROLLER DRIVER (URCD)-PAL INTERFACE

RELATED APPLICATION

This application is related to an Application bearing Ser. No. 12/334,110 entitled "Power Settings in Wireless Ultra-Wide Band Universal Serial Bus" filed on Dec. 12, 2008, the disclosure of which is incorporated by reference herein.

BACKGROUND

Ultra-Wideband (UWB) technology enables information to be transmitted over a large bandwidth and can enable high data rate wireless connectivity. UWB technology is described in a set of specifications defined by the WiMedia Alliance (referred to hereinafter as "WiMedia"). In a typical scenario, a host controller wirelessly communicates with one or more devices. A host controller can be embodied on a computing device such as a desktop or laptop computer.

Ultra-Wideband hardware includes a radio controller sub function called the "URC" and one or more sub-functions which run on top of the radio and are considered clients of the radio. Each of the clients is referred to as a Protocol Adaption Layer or "PAL". Today, PALs exist in the form of Wireless USB PALs, but in the future different bus technologies will inevitably lead to the incorporation of different PALs such as, for example, WUSB PALs, WLP PALs, Bluetooth PALs, vendor-specific PALs and the like.

Individual PALs are utilized to establish connections with associated devices and can share the same UWB radio. As such, hardware and software stacks can be designed to support multiple different types of PALs. One of the challenges associated with enabling wireless connectivity between host controllers and associated devices is to develop two-way interfaces that enable communication between a URC driver (referred to as "URCD") and PAL drivers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a two-way interface between a URC driver ("URCD") and various Protocol Adaption Layer (PAL) drivers. The two-way interface can enable bandwidth to be shared and managed among multiple different PALs. The two-way interface can also be used to implement common radio functionality such as beaconing, channel selection, and address conflict resolution. In at least some embodiments, the two-way interface can be utilized for power management to place PALs in lower power states to conserve power and to support remote wake-up functionality. Further, at least some embodiments can enable vendor-specific PALs to interact with vendor-specific hardware.

BRIEF DESCRIPTION OF THE DRAWINGS

The same numbers are used throughout the drawings to reference like features.

DETAILED DESCRIPTION

Overview

Various embodiments provide a two-way interface between a URC radio driver (referred to as the "URCD") and various Protocol Adaption Layer (PAL) drivers. The two-way interface can enable bandwidth to be shared and managed among multiple different PALs. The two-way interface can also be used to implement common radio functionality such as beaconing, channel selection, and address conflict resolution. In at least some embodiments, the two-way interface can be utilized for power management to place PALs in lower power states to conserve power and to support remote wake-up functionality. Further, at least some embodiments can enable vendor-specific PALs to interact with vendor-specific hardware. In the discussion that follows, Ultra-Wideband technology is utilized to enable different bus technologies to establish a wireless connection with devices and to allow interaction between PAL drivers, the URCD and hardware associated with the PAL drivers.

In the discussion that follows, a section entitled "Operating Environment" describes but one environment in which the various embodiments can be employed. Following this, a section entitled "Example Radio Software" describes a radio software architecture in accordance with one or more embodiments. Next, a section entitled "URCD-PAL Interface—Implementation Example" describes an example interface in accordance with one or more embodiments. Following this, a section entitled "Example Sequence of Operations" describes an example sequence of operations in accordance with one or more embodiments. Next, a section entitled "Example Interface" gives specific examples of an implementation of the URCD-PAL interface. Following this, a section entitled "Power Management" describes an example sequence of power conserving operations in accordance with one or more embodiments. Last, a section entitled "Example System" describes an example system that can implement one or more embodiments.

Operating Environment

Figure 1:
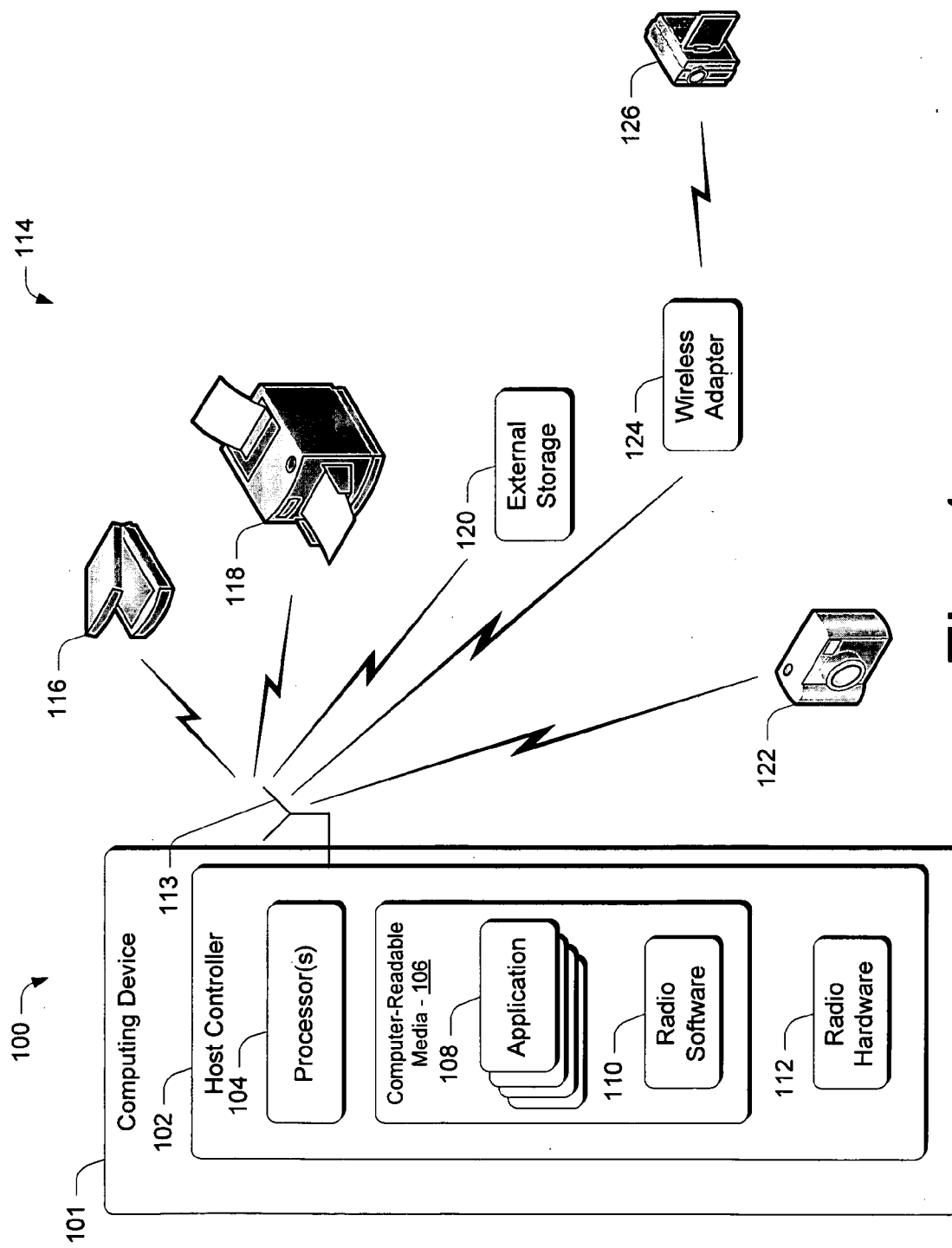
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 101 embodying a wireless host controller 102. The computing device 101 can take any suitable form examples of which include, by way of example and not limitation, desk top computers, laptop computers and the like. In this particular example, host controller 102 includes one or more processors 104, one or more computer-readable media 106 and, in at least some embodiments, one or more applications 108 that reside on the computer-readable media and which are executable by the processor(s). Applications 108 can include any suitable type of application.

Host controller 102 also includes radio software 110 which interfaces with radio hardware 112 to enable wireless communication with one or more external devices. In the illustrated and described embodiments, the host controller 102 utilizes Ultra-Wideband technology, e.g., any technology whose signals span a frequency range greater than 500 MHz, as a medium to enable wireless communication with the external devices. It is to be appreciated and understood that the various embodiments described herein can be utilized in connection with UWB technology that is compliant with specifications defined by WiMedia, as well as others.

The radio software 110 can include, in one or more embodiments, one or more Protocol Adaption Layers (PALs) and an Ultra-Wideband Radio Controller Driver (URCD). The PAL(s) use an interface with the URCD to manage use of shared resources, e.g. the radio. Host controller 102 includes an antenna 113 via which wireless communication can take place with a number of external devices shown generally at 114.

Devices 114 can include, by way of example and not limitation, a scanner 116, a printer 118, external storage 120, a digital camera 122, a wireless adapter 124 and/or a digital camcorder 126. The external devices interface, in at least some embodiments, with host controller 102 via a Wireless Universal Serial Bus (WUSB) which leverages Ultra-Wideband technology, as will become apparent below. Other means of connecting with the host controller can be used including other bus technologies and transports including, but not limited to PCI, PCIe, cardbus, expresscard and the like.

The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

Having considered an example operating environment, consider now a discussion of example radio software in accordance with one or more embodiments.

Example Radio Software

Figure 2:
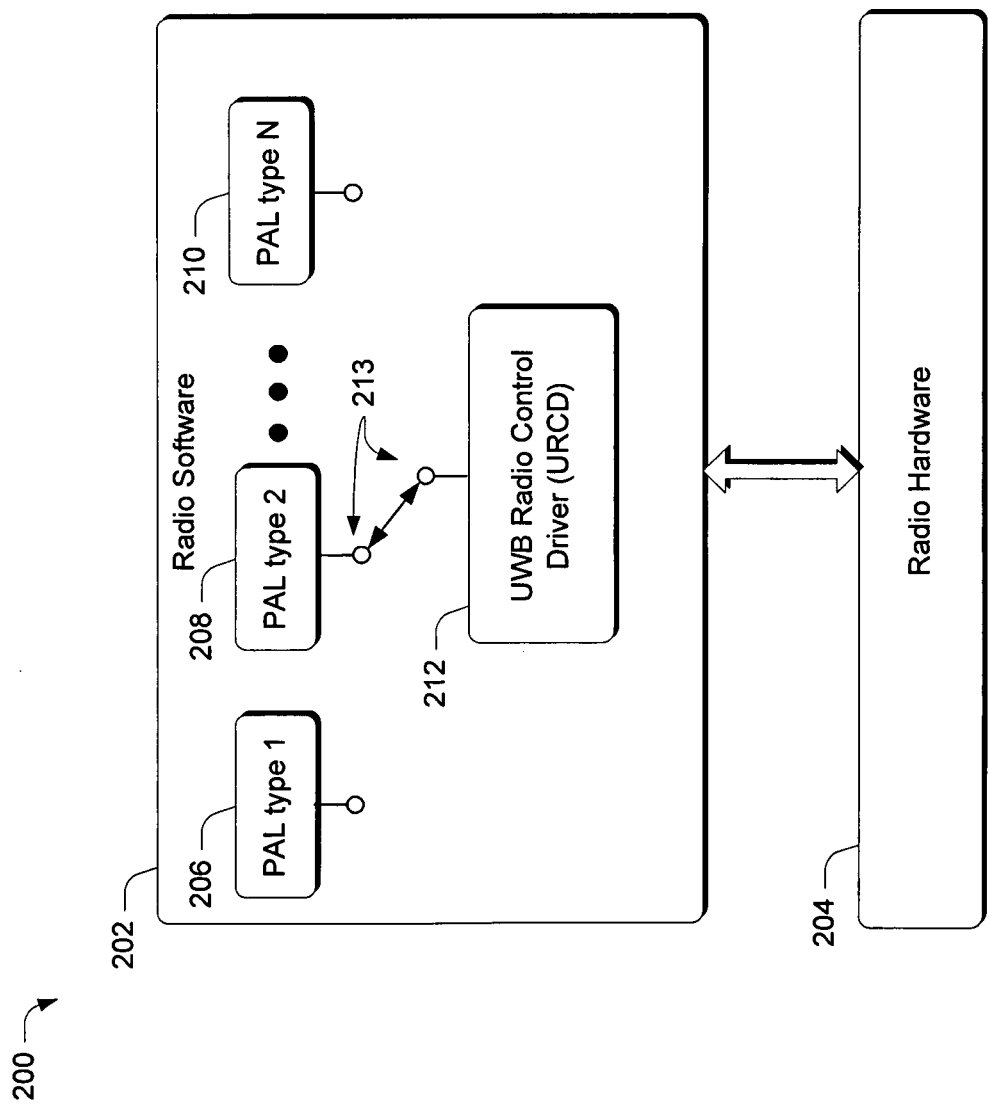
FIG. 2 illustrates a system in accordance with one or more embodiments.

FIG. 2 illustrates a system generally at 200 in accordance with one or more embodiments. In this example, system 200 includes radio software 202 and radio hardware 204. Radio software 202 includes one or more Protocol Adaption Layer (PAL) drivers 206, 208, and 210, also referred to hereinafter as "PALs". The PALs can comprise any suitable type of PALs. In the illustrated and described embodiment, the PALs are associated with bus technologies such as WUSB, WLP, Bluetooth, and/or vendor-specific bus technologies. In addition, radio software 202 includes a radio control driver (URCD) 212 that serves as one interface between the PALs and radio hardware 204. Radio hardware includes a radio controller referred to in this document as the "URC". The radio software can run on a computing device, such as the one described above. Alternately or additionally, the radio software can run directly on the radio hardware.

In the illustrated and described embodiment, PALs 206, 208, 210 and URCD 212 communicate by way of a two-way interface or API that is represented using the plug notation generally at 213. An example of a suitable API is described below.

As will be appreciated by the skilled artisan and as noted above, Ultra-Wideband (UWB) can enable different bus technologies (WUSB, WLP, Bluetooth, Vendor Specific, etc) to establish a connection with their associated devices. UWB also has the potential that more than one bus technology can share the same UWB Radio. In this context, URCD 212 is configured to perform a number of different functions including, by way of example and not limitation, beaconing, channel selection, bandwidth allocation, conflict resolution, and address management. In addition, individual PALs are configured to perform a number of different functions including,
by way of example and not limitation, requesting bandwidth from the URCD and using bandwidth allocated from the URCD to perform data transfers, set up PAL-specific channels, and the like.

To accomplish these functions, the PALs and the URCD communicate using a two-way interface an example of which is provided below.

FIG. 2 represents a driver architecture for a PCI-connected or a USB-connected UWB Host. In operation, the URCD loads on top of the Physical Device Object (PDO) that is enumerated by the PCI stack or the USB stack. The URCD enumerates children stacks for each PAL functionality present on the host system.

To enable communication between the PALs and the URCD, the URCD creates a Query Interface for which the PAL drivers can query. In one implementation, each PAL driver sends an IRP_MN_QUERY_INTERFACE to exchange an interface between the PAL and the URCD. A Radio Management Layer exposes a table of functions that PALs can call, and PALs expose a table of notification callbacks that the URCD can call. This interface is used by both the PAL and the URCD to communicate with each other.

Having considered example radio software including a driver architecture in accordance with one or more embodiments, consider now a discussion of an example URCD-PAL interface.

URCD-PAL Interface—Implementation Example

In operation, the URCD-PAL Interface utilizes a number of different data structures and data types, examples of which are provided below.

STATUS—This represents the standard NTSTATUS. Custom status codes can be defined here.

PAL_HANDLE—Handle to the PAL. This gets assigned by the URCD to the PAL during initial PAL registration discussed below. PAL uses this handle when calling into URCD.

IE_HANDLE—Handle to an information element that was added by the PAL.

NOTIFICATION_LEVEL—A data type used by some functions described below. This type is defined as an enum:

```
typedef enum {
    URC_Register,
    URC_RegisterForChange,
} NOTIFICATION_LEVEL
```

PAL_Identifier—2 byte value (e.g. a USHORT). This value identifies the PAL's function. PAL fills in this value during registration. The higher order byte is reserved and should be 0. The lower order byte is the URC capability ID.

MAC_CAP_BITMAP—A data type defining the Medium Access Controller (MAC) Capabilities:

```
typedef union _MAC_CAP_BITMAP {
    //
    //The first member of the union is present only
    //for making bit operations simpler
    //
    USHORT  AsUshort;
    BYTE    Bitmap[2];
} MAC_CAP_BITMAP , *PMAC_CAP_BITMAP;
```

PHY_CAP_BITMAP—A data type defining the physical interface (Phy) Capabilities:

```
typedef union _PHY_CAP_BITMAP {
    //
    //The first member of the union is present only
    //for making bit operations simpler
    //
    ULONG    AsUlong;
    BYTE     Bitmap[3];
} PHY_CAP_BITMAP;
```

UWB_BW_INTERVAL: Enum to specify bandwidth (BW) Interval while requesting BW. A "zone" is a set of sixteen temporally consecutive MASes.

```
typedef enum _UWB_BW_INTERVAL {
    UWB_BW_INTERVAL_DONT_CARE = 0,
    UWB_BW_INTERVAL_EVERY_ZONE = 1,
    UWB_BW_INTERVAL_EVERY_2_ZONES = 2,
    UWB_BW_INTERVAL_EVERY_4_ZONES = 4,
    UWB_BW_INTERVAL_EVERY_8_ZONES = 8,
    UWB_BW_INTERVAL_EVERY_16_ZONES = 16,
    UWB_BW_INTERVAL_INVALID
} UWB_BW_INTERVAL;
```

UWB_MAS_MAP—struct used to keep track of MAS Map in a superframe. A "MAS" refers to a Media Access Slot which is a 256 microsecond unit of time.

```
typedef unsigned short UWB_ZONE_MAP, *PUWB_ZONE_MAP;
typedef struct _UWB_MAS_MAP {
    UWB_ZONE_MAP ZoneMap[16];
} UWB_MAS_MAP, *PUWB_MAS_MAP;
```

CHANNEL_BITMAP—struct used to keep track of supported channels:

```
typedef union _CHANNEL_BITMAP {
    //
    //The first member of the union is present only
    //for making bit operations simpler
    //
    ULONG64 AsUlong64;
    BYTE    Bitmap[8];
} CHANNEL_BITMAP, *PCHANNEL_BITMAP;
```

If we call the least significant bit within a byte as Bit0 and the most significant bit as Bit7, then the following is the mapping of bits in the Channel BitMap to actual channel numbers.

| | |
|---|---|
| Bitmap[0] | All bits Unused |
| BitMap[1] | Bit0 to Bit6 represent channels 9 to 15 in that order. Bit7 is unused. |
| BitMap[2] | Bit0 to Bit6 represent channels 17 to 23 in that order. Bit7 is unused. |
| BitMap[3] | Bit0 to Bit6 represent channels 25 to 31 in that order. Bit7 is unused. |
| BitMap[4] | Bit0 to Bit6 represent channels 33 to 39 in that order. Bit7 is unused. |
| BitMap[5] | Bit0 to Bit4 are unused. Bit5 and Bit6 represent channels 45 and 46 respectively. Bit7 is unused. |
| BitMap[6] | All bits unused |
| BitMap[7] | All bits unused |

If a bit is set, it means the represented channel is supported and if bit is not set, then the channel is not supported.

UWB_BW_REQUEST_STATUS—enum used to maintain the state of a BW Request

```
typedef enum _UWB_BW_REQUEST_STATUS {
    //
    // UWB_BW_ALLOCATED:
    //     used when a Critical BW is allocation is
    //         complete
    //     or when an varying BW allocation is
    //         updated
    //
    UWB_BW_ALLOCATED,
    //
    // UWB_BW_NEGOTIATING
    //
    //
    UWB_BW_NEGOTIATING,
    //
    // UWB_BW_FAILED
    //     used when a Critical BW allocation fails
    //     because we are not able to negotiate BW for
    //     it.
    UWB_BW_FAILED,
    //
    // UWB_BW_UNSUPPORTED
    //     this type of BW Request is Unsupported.
    //
    UWB_BW_UNSUPPORTED,
    UWB_BW_LOST,
    UWB_BW_RENEGOTATING,
    UWB_BW_CHANGED,
    UWB_BW_PENDING,
} UWB_BW_REQUEST_STATUS;
```

Having described some example data structures and data types, consider first a discussion of a sequence of operations that can be performed by a PAL in accordance with one or more embodiments. Following this discussion, a description of an example interface is provided to illustrate but one way the example sequence of operations can be performed.

Example Sequence of Operations

To begin a sequence of operations, a PAL will typically register with the URC using a particular interface. In the example just below, the PAL registers with the URC by using IRP_MN_QUERY_INTERFACE. Next, a means of communication is established between the PAL and the URCD.

After starting the channel, the following operations can be performed in any order and/or multiple times: allocate and release bandwidth; add/remove IEs; send vendor specific commands; acquire/release TKIDs ("Temporal Key Identifiers" that are used to secure a given packet); get information from URC such as: DevAddress, PhyCapabilityBitMap, MacCapabilityBitMap; set a new channel BitMask; and/or perform a sleep resume cycle.

A cleanup can also be performed for all the commands executed in paragraph [0045]. This can include, by way of example and not limitation, releasing and deleting BW handles and groups; removing added IEs; and/or releasing TKIDs.

The channel can also be stopped when communication is to be terminated and the PAL may or may not unregister with the URC.

It is to be appreciated and understood that the operational steps that begin with starting a channel and continue through those described in the paragraph just above can be repeated any number of times. Having considered an example sequence of operations in accordance with one or more embodiments, consider now a discussion of an example interface that can be used to implement the above-described sequence of operations as well as other operations.

Example Interface

In this section, a formal definition of a URCD-to-PAL Interface is provided. The URCD-to-PAL Interface is exchanged between the URCD and the PAL by IRP_MN_QUERY_INTERFACE. The guide for this interface is defined by:

```
//
// {CD16C6F8-61CC-4b60-95B7-E91916B0CABD}
//
DEFINE_GUID(GUID_UWB_PAL_INTERFACE,
    0xcd16c6f8,
    0x61cc, 0x4b60,
    0x95, 0xb7, 0xe9, 0x19,
    0x16, 0xb0, 0xca, 0xbd);
```

The type of the interface is UWB_PAL_INTERFACE. It is defined as:

```
typedef struct _UWB_PAL_INTERFACE {
//
//Generic header
//
INTERFACE                Interface;
//
//Information to go from PAL to UWB
//
UWB_FROM_PAL_INFO        UwbFromPalInfo;
//
//Information to go from UWB to PAL
//
UWB_TO_PAL_INFO          UwbToPalInfo;
} UWB_PAL_INTERFACE, *PUWB_PAL_INTERFACE;
//
// The Generic Header
//
typedef struct _INTERFACE {
  USHORT Size;
  USHORT Version;
  PVOID Context; //UNUSED
  PINTERFACE_REFERENCE ;//UNUSED
  PINTERFACE_DEFEFERENCE; //UNUSED
} INTERFACE, *PINTERFACE;
//
//Information to go from PAL to UWB
//
typedef struct _UWB_FROM_PAL_INFO {
//
//PAL_Identifier is the same thing as Capability Id
//
USHORT                      PAL_Identifier;
ULONG                       Flags;
PVOID                       PalContext;
PFN_URCD_DEV_ADDR_CHANGE_NOTIFICATION
                            AddrChangeNotification;
PFN_URCD_PREPARE_CHANNEL_CHANGE
                            PrepareChannelChange;
PFN_URCD_CHANNEL_CHANGE_NOTIFICATION
                            ChannelChangeNotification;
PFN_URCD_VENDOR_SPECIFIC_EVENT_NOTIFICATION
                            VendorSpecificEventNotification;
PFN_URCD_COMMAND_FRAME_RECEIVED_NOTIFICATION
                            CommandFrameReceivedNotification;
PFN_URCD_PREPARE_FOR_REMOTE_WAKE_BW_CHANGES
                            PrepareForRemoteWakeBwChanges;
PFN_URCD_REMOTE_WAKE_BW_CHANGES_COMPLETE
                            NoMoreRemoteWakeBwChanges;
} UWB_FROM_PAL_INFO, *PUWB_FROM_PAL_INFO;
//
//Information to go from UWB to PAL
//
typedef struct _UWB_TO_PAL_INFO {
```

-continued

```
PAL_HANDLE                  PalHandle;
PFN_URCD_UNREGISTER_PAL
                            UnregisterPal;
//
//Querying URC Info
//
PFN_URCD_GET_DEV_ADDRESS
                            GetDevAddress;
PFN_URCD_GET_MAC_ADDRESS
                            GetMacAddress;
PFN_URCD_GET_PHY_CAPABILITY_BITMAP
                            GetPhyCapabilityBitMap;
PFN_URCD_GET_MAC_CAPABILITY_BITMAP
                            GetMacCapabilityBitMap;
//
//Unique TKID generation
//
PFN_URCD_ACQUIRE_TKID
                            AcquireTKID;
PFN_URCD_RELEASE_TKID
                            ReleaseTKID;
//
//Channel Management
//
PFN_URCD_SET_CHANNEL_BIT_MASK
                            SetChannelBitMask;
PFN_URCD_START_CHANNEL
                            StartChannel;
PFN_URCD_STOP_CHANNEL
                            StopChannel;
//
// BandWidth Negotiation
//
PFN_URCD_BW_GROUP_CREATE
                            BWGroupCreate;
PFN_URCD_BW_GROUP_RELEASE_AND_DELETE_ALL_BW
                            BWGroupReleaseAndDeleteAllBw;
PFN_URCD_BW_GROUP_DELETE
                            BWGroupDelete;
PFN_URCD_BW_GROUP_UPDATE_MAS_AVAILABILITY
                            BWGroupUpdateMasAvailability;
PFN_URCD_BW_CREATE
                            BWCreate;
PFN_URCD_CRITICAL_BW_RESERVE
                            CriticalBWReserve;
PFN_URCD_VARYING_BW_RESERVE
                            VaryingBWReserve;
PFN_URCD_BW_RELEASE
                            BWRelease;
PFN_URCD_BW_DELETE
                            BWDelete;
PFN_URCD_VARYING_BW_INITIATE_AUTO_ADJUST
                            VaryingBWInitiateAutoAdjust;
PFN_URCD_BW_UPDATE_MAS_AVAILABILITY
                            BWUpdateMasAvailability;
//
//IE Management
//
PFN_URCD_ADD_IE             AddIE;
PFN_URCD_REMOVE_IE          RemoveIE;
//
//Vendor Specific Commands/Events
//
PFN_URCD_VENDOR_SPECIFIC_COMMAND
                            VendorSpecificCommand;
PFN_URCD_SEND_COMMAND_FRAME
                            SendCommandFrame;
} UWB_TO_PAL_INFO, *PUWB_TO_PAL_INFO;
```

The following is an explanation of various fields and functions employed by the Interface in accordance with one or more embodiments.

Struct INTERFACE

USHORT Size—Size should be size of the interface.

USHORT Version—Version should be the version of the interface.

PVOID Context—This is unused and should be NULL.

Registration of a PAL

In the illustrated and described embodiment, registration of a PAL happens by the IRP_MN_QUERY_INTERFACE. The PAL fills in the following portions of the URCD_INTERFACE structure and sends it down to the URCD with the IRP_MN_QUERY_INTERFACE Irp.

Interface

UwbFromPalInfo

As part of UwbFromPalInfo, PAL passes a "PalContext" to the URCD. This context is used by URCD whenever calling back into the PAL. The URCD gets the desired information from the URCD_INTERFACE, adds URCD specific information in the following portion and completes the IRP.

UwbToPalInfo

As part of UwbToPalInfo, URCD assigns a PAL_HANDLE to the PAL. The PAL_HANDLE is used by the PAL whenever calling into the URCD to identify itself. This completes the registration process. The following functions are used in relation to registration activities:

UnRegisterPAL

```
VOID
UnregisterPAL(
    PAL_HANDLE PalHandle
)
```

Arguments:
a. PalHandle is the handle that was assigned by the URCD during registration.

This is a routine to un-register the PAL. Before the PAL un-registers, it ensures that:
  All the Bandwidth Objects that it requested have been released and deleted;
  It has deleted all the IEs and ASIEs (Application Specific Information Elements) that it had added; and
  It has successfully stopped the channel if it had started it.

Figure 3:
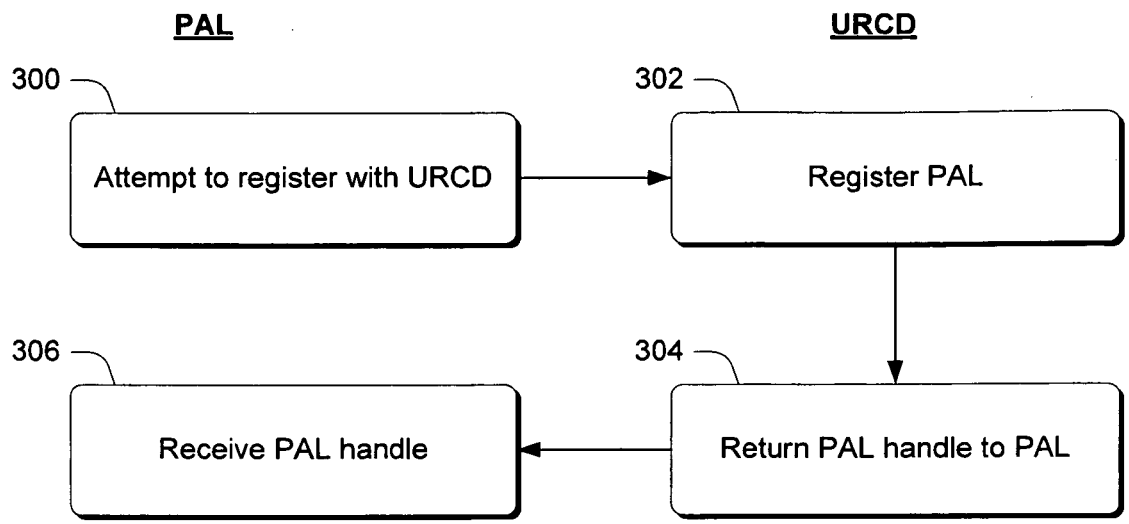
FIG. 3 is a flow diagram that describes steps in a method in accordance with one or more embodiments.

FIG. 3 is a flow diagram that describes steps in a registration method in accordance with one or more embodiments. The steps can be implemented in connection with any suitable hardware, software, firmware or combination thereof. In at least some embodiments, the method can be implemented in software by, for example, a driver architecture such as the one described above. In the illustrated example, the flow diagram is divided into two portions—one designated "PAL" to depict acts performed by a PAL, and another designated "URCD" to depict acts performed by a URCD.

Step 300 attempts to register with a URCD. The step can be performed in any suitable way an example of which is provided above. Step 302 registers the PAL and step 304 returns a PAL handle to the PAL that just registered.

Step 306 receives the PAL handle. The PAL handle can be used for subsequent calls into the URCD as will become apparent below.

Registration for Notifications

In the illustrated and described embodiment, there are three categories of notification callbacks for which a PAL may register.
  1. Notifications to a PAL about a frame (Beacon frame or Command frame) received by the URCD from a device that corresponds to the PAL, and,
  2. Notifications to a PAL about URC events such as Device Address Conflict, Start Beacon, Stop Beacon, Channel Change, etc.
  3. Notification/Events that have a vendor specific Event Code.

Examples of functions that are utilized in connection with notification registrations include, by way of example and not limitation:

RegisterForBeaconNotifications

```
NTSTATUS
RegisterForBeaconNotifications(
    _in       PAL_HANDLE              PalHandle,
    _in       NOTIFICATION_LEVEL      NotificationLevel,
    _in       PFN_URCD_BEACON_NOTIFICATION
                                      BeaconNotification,
    _in _opt  PVOID                   Context
)
```

This function allows a PAL to register for beacon notifications/beacon change notifications from its all devices or a particular device.

Arguments:
a. Pal: The handle that the PAL received when the PAL registered with the URCD.
b. NotificationLevel: An enum with the following definition. For context, reference to the NOTIFICATION_INFO data type can be made:
  i. URC_Register=Register for Beacon Notifications. This means that the notification callback is called whenever a beacon is received.
  ii. URC_RegisterForChange=Register for Beacon Changed Notification. This means that the notification callback is called whenever the received beacon has changed. This can be based on a hashing function and thus may rarely miss a beacon change notification.
c. BeaconNotification: Callback function to be implemented by PAL. URCD will use this function to send beacon notifications to the PAL. The prototype is: VOID.

```
BeaconNotification(
    _in_opt   PVOID     Context,
    _in       ULONG     Length,
    _in       PBYTE     BeaconData
)
```

Context: Context that was passed during RegisterForBeaconNotifications
Length: Length of the beacon
BeaconData: Beacon Data
Return Value:
Returns an NT_SUCCESS( ) value if Register call is successful; otherwise an appropriate error is returned.

UnregisterForBeaconNotifications

```
VOID UnregisterForBeaconNotifications(
    _in PAL_HANDLE     Pal
)
```

This function allows a PAL to unregister for beacon received notifications/beacon change notifications from all its devices or a particular device.

Arguments:
  a. Pal: The handle to the PAL received when the PAL registered with the URCD.
Return Value:
NONE RegisterForIENotifications

```
NTSTATUS
RegisterForIENotifications(
    __in        PAL_HANDLE              PalHandle,
    __in        BYTE                    IESpecifierID,
    __in        NOTIFICATION_LEVEL      NotificationLevel,
    __in        PFN_URCD_IE_NOTIFICATION
                                        IENotification,
    __in _opt   PVOID                   Context
)
AND
```

RegisterForASIENotifications

```
NTSTATUS
RegisterForASIENotifications(
    __in        PAL_HANDLE              PalHandle,
    __in        BYTE                    ASIESpecifierID,
    __in        NOTIFICATION_LEVEL      NotificationLevel,
    __in        PFN_URCD_ASIE_NOTIFICATION
                                        ASIENotification,
    __in _opt   PVOID                   Context
)
```

This function allows a PAL to register for IE or ASIE received notifications/change notifications from its all devices or a particular device.
Arguments:
a. Pal: The handle to the PAL received when the PAL registered with the URCD.
b. ASIESpecifierID: ULONG representing ASIE Specifier IDs.
OR
IESpecifierID: BYTE representing IE Specifier IDs.
c. NotificationLevel: An Enum using the following definition. Reference can be made to the NOTIFICATION_INFO data type:
  i. URC_Register=Register for IE or ASIE Notifications. This means that the notification callback is called whenever the IE or ASIE is received.
  ii. URC_RegisterForChange=Register for IE or ASIE Changed Notification. This means that the notification callback is called whenever the received IE or ASIE has changed. This may be based on a hashing function and thus it is possible to rarely miss an IE or ASIE change notification.
d. ASIENotification: A notification callback of the prototype VOID.

```
ASIENotification(
    __in    PVOID   Context,
    __in    ULONG   ASIELength,
    __in    PBYTE   ASIEData
)
OR
IENotification: A notification callback of the prototype
VOID
IENotification(
    __in    PVOID   Context,
    __in    ULONG   IELength,
    __in    PBYTE   IEData
)
```

Return Value:
Returns an NT_SUCCESS( ) value if Register call is successful; otherwise an appropriate error is returned.

UnregisterForASIENotifications

```
VOID UnregisterForASIENotifications(
    __in    PAL_HANDLE  Pal,
    __in    ULONG       ASIESpecifierID
)
AND
```

UnregisterForIENotifications

```
VOID UnregisterForIENotifications_(
    __in    PAL_HANDLE  Pal,
    __in    ULONG       IESpecifierID
)
```

These functions allow a PAL to unregister for IE or ASIE notifications/IE or ASIE change notifications from its all or particular devices.
Arguments:
a. Pal: The handle to the PAL received when the PAL registered with the URCD.
b. ASIESpecifierID: ULONG representing ASIE Specifier IDs.
OR
IESpecifierID: BYTE representing IE Specifier IDs.
Return Value:
NONE In one or more embodiments, a PAL may register for some other notification callbacks with the URCD. It does this by implementing the following notification callbacks. These notification callbacks are sent to the URCD when the PAL registers with the URCD using the IRP_MN_QUERY_INTERFACE.
AddrChangeNotification

```
VOID
AddrChangeNotification (
    __in PVOID      PalContext,
    __in DEVADDR    Address
);
```

This function is used whenever the URCD sets a new 16 bit device address, it will call using this function to notify the PAL about it.
Arguments:
a. PalContext: Context that was passed by the PAL during registration (in the UwbFromPalInfo structure).
b. Address: The new 16 bit dev address
PrepareChannelChange

```
VOID
PrepareChannelChange (
    __in    PVOID   PalContext,
    __in    UCHAR   Channel,
    __in    UCHAR   ChangeCountDown,
    __in    PFN_URCD_PREPARE_CHANNEL_CHANGE_COMPLETION
                    PrepareChannelChangeCompletion
);
```

This function is used whenever the URCD is about to change a channel. It first calls the PAL to let it know about the change and to give the PAL a chance to let its devices know about the change. When the PAL is done processing this notification, it calls the PrepareChannelChangeCompletion function that was passed in this function by the URCD.

Arguments:
a. PalContext: Context that was passed by PAL during registration (in the UwbFromPalInfo structure).
b. Channel: The target channel that URCD is going to shift to.
c. ChangeCountDown: The number of superframes after which URCD is going to change the channel.
d. PrepareChannelCompletionRoutine: Pal calls this function after it is done processing the change channel request. The prototype is

```
VOID
PrepareChannelChangeCompletion(
    _in    PAL_HANDLE    PalHandle
)
```

ChannelChangeNotification

```
VOID
ChannelChangeNotification(
    _in PVOID    PalContext,
    _in UCHAR    Channel
```

-continued

```
);
```

This function is used by URCD to notify PAL about a channel change operation.

Arguments:
a. PalContext: Context that was passed by PAL during registration (in the UwbFromPalInfo structure).
b. Channel: The new channel being used by URCD VendorSpecificEventNotification

```
VOID
VendorSpecificEventNotification (
    _in PVOID    PalContext,
    _in PVOID    Rceeb
);
```

This function is used by URCD to notify PAL about a vendor specific event received from the hardware. URCD just acts a pass through in this case and it is up to the PAL to decode the event.

Arguments:
a. PalContext: Context that was passed by PAL during registration (in the UwbFromPalInfo structure).
b. Rceeb: The new RCEEB (Radio Controller Extended Event Block) received by the hardware. The size information is contained within the RCEEB—so no separate parameter is used.

CommandFrameReceivedNotification

```
VOID
CommandFrameReceivedNotification (
    _in    PVOID     PalContext,
    _in    ULONG     RcebSize,
    _in    PVOID     Rceb
);
```

This function is used by URCD to notify PAL about a command frame received over the air.

Arguments:
a. PalContext: Context that was passed by PAL during registration (in the UwbFromPalInfo structure).
b. RcebSize—Size of the RCEB (Radio Controller Event Block) received by the hardware
c. Rceb—RCEB received by the hardware.

PrepareForRemoteWakeBwChanges

```
VOID
PrepareForRemoteWakeBwChanges (
    _in    PVOID  PalContext,
    _in PFN_URCD_PREPARE_REMOTE_WAKE_BW_CHANGES_COMPLETION
           PrepareRemoteWakeBwChangesCompletion
);
```

This function is used whenever the URCD is about to send allocation changes for its remote wake bandwidth. It first calls the PAL to let it know about the allocation change and give it a chance to prepare. If the PAL is sleeping, it might need to wake up its hardware. When PAL is done processing this notification, it calls the completion function that was passed by URCD:

PrepareRemoteWakeBwChangesCompletion.

Arguments:
a. PalContext: Context that was passed by PAL during registration (in the UwbFromPalInfo structure).
b. PrepareRemoteWakeBwChangesCompletion: Pal calls this function after it is ready to receive Remote Wake Bw Changes. The prototype is VOID

```
VOID
PrepareRemoteWakeBwChangesCompletion (
    _in    PAL_HANDLE    PalHandle
)
```

NoMoreRemoteWakeBwChanges

```
VOID
NoMoreRemoteWakeBwChanges (
    _in    PVOID  PalContext,
    _in PFN_URCD_NO_MORE_REMOTE_WAKE_BW_CHANGES_COMPLETION
```

```
            NoMoreRemoteWakeBwChangesCompletion
);
```

This function is used whenever the URCD is about to send allocation changes for its remote wake bandwidth, it first calls in the PAL to let it know about the allocation change and give it a chance to prepare through PrepareForRemoteWakeBwChanges. When URCD is done sending all the notifications for changes in remote wake bandwidth, it calls NoMoreRemoteWakeBwChanges. If the PAL woke itself up for these changes, it might need to go back to sleep. When PAL is done processing this notification, it calls the completion function, NoMoreRemoteWakeBwChangesCompletion.
Arguments:
a. PalContext: Context that was passed by PAL during registration (in the UwbFromPalInfo structure).
b. NoMoreRemoteWakeBwChangesCompletion: Pal calls this function after it has done processing the notification. The prototype is

```
            VOID
            NoMoreRemoteWakeBwChangesCompletion (
                __in    PAL_HANDLE    PalHandle
            )
```

Figure 4:
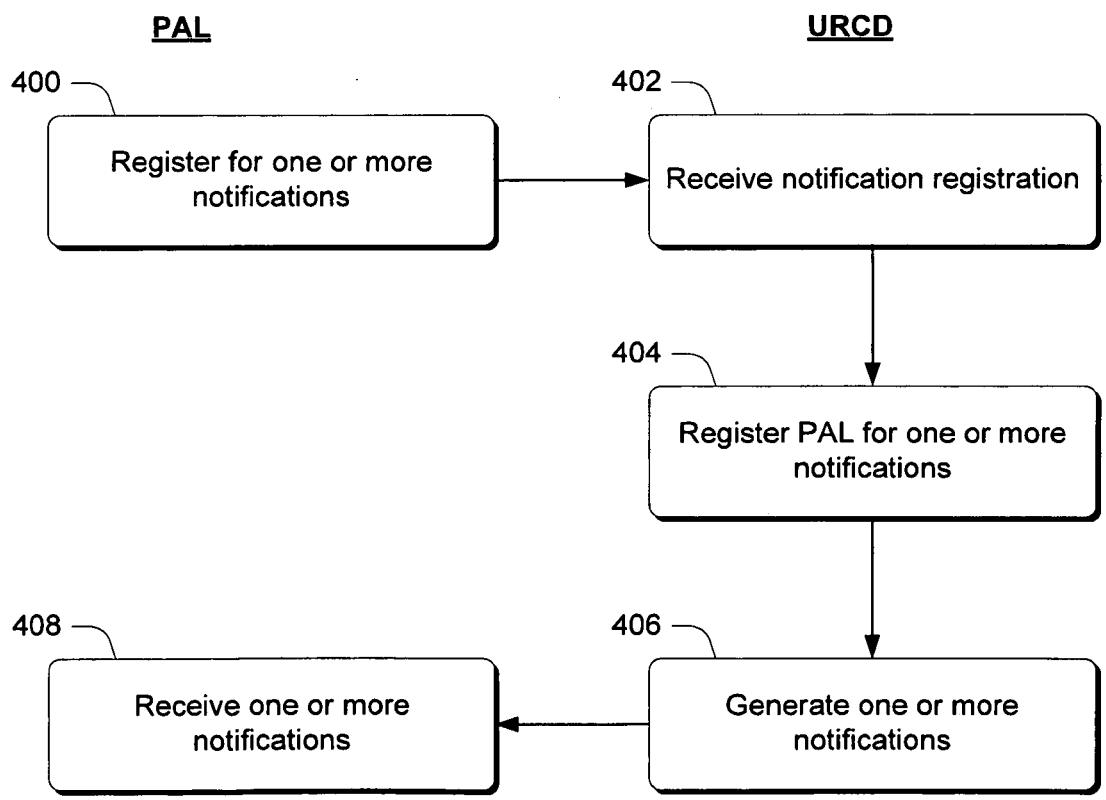
FIG. 4 is a flow diagram that describes steps in a method in accordance with one or more embodiments.

FIG. 4 is a flow diagram that describes steps in a notification registration method in accordance with one or more embodiments. The steps can be implemented in connection with any suitable hardware, software, firmware or combination thereof. In at least some embodiments, the method can be implemented in software by, for example, a driver architecture such as the one described above. In the illustrated example, the flow diagram is divided into two portions-one designated "PAL" to depict acts performed by a PAL, and another designated "URCD" to depict acts performed by a URCD.

Step 400 registers for one or more notifications. Examples of how a PAL can register for a notification and various types of notifications are described above. Step 402 receives a notification registration from the PAL and step 404 registers the PAL for one or more notifications. In an event a registered-for notification is generated, step 406 generates one or more notifications and sends the notifications to the PAL that registered for the notification(s).

Step 408 receives the one or more notifications from the URCD.

Adding IE & ASIE

In one or more embodiments, a PAL may request the URCD to add certain IEs and ASIEs to the HOST Beacon. In connection with these activities, the following functions can be used:
AddIE

```
    VOID
    AddIE(
        __in        PAL_HANDLE    PalHandle,
        __in        USHORT        Length,
        __in        BYTE*         IEBuffer,
        __in        PFN_URCD_ADD_IE_COMPLETION
                                  CompletionCallback,
        __in_opt    PVOID         Context
    );
```

This function allows the PAL to add ASIEs and/or certain other types of IEs.
Arguments:
a. Pal: The handle to the PAL received when the PAL registered with the URCD.
b. Length: Length of IE_Buffer in Bytes.
c. IE Buffer: A buffer containing an IE or an ASIE.
d. AddIECompletionCallback: URCD will call this function when either the IE has been successfully added to the hardware or if there is a failure.
The prototype for the callback is:

```
    typedef
    VOID
    AddIECompletionCallback(
        __in        NTSTATUS       Status,
        __in        URC_IE_HANDLE  IEHandle,
        __in_opt    PVOID          Context
    )
```

Status: is the result of trying to add the given IE
Context: is the context which was passed in the AddIE function.
IEHandle: is the handle to the IE that should be preserved by the PAL to be used later while removing the IE
e. Context: The context that will be passed back in the CompletionCallback
Return Value:
VOID
RemoveIE

```
    VOID
    RemoveIE(
        __in        PAL_HANDLE      PalHandle,
        __in        URC_IE_HANDLE   IEHandle,
        __in        PFN_URCD_REMOVE_IE_COMPLETION
                                    Completion,
        __in_opt    PVOID           Context
    )
```

This function allows the PAL to remove IEs and ASIEs from the URCs beacon. The PAL can remove the IEs it added with the AddIEs API call.
Arguments:
a. Pal: The handle to the PAL received when the PAL registered with the URCD.
b. IEHandle: Handle that was given to the PAL during AddIECompletionCallback.
c. RemoveIECompletionCallback: URCD will call this function when the IE has been successfully deleted
The prototype for the callback is:

```
    typedef
    VOID
    RemoveIECompletionCallback(
        __in_opt    PVOID    Context
    )
```

Context: is the context which was passed in the RemoveIE function.

d. Context: The context that will be passed back in the CompletionCallback

Return Value:

NONE.

RemoveAllIEs (PAL_HANDLE Pal)

This function allows the PAL remove all IEs and ASIEs that it had added with the AddIEs API call.

Arguments:

a. Pal: The handle to the PAL received when the PAL registered with the URCD.

Return Value:

NONE.

In one or more embodiments, there can be a callback that the PAL provides that can tell the client that all the IE data it had notified about has been deleted. This would be helpful in a recovery situation in case an unexpected error happens in the URCDs IE module. Alternately or additionally, there can be a callback that the PAL provides that could be a reset callback that would mean that the URCD has reset itself and now contains no PAL specific information. In this case, the PALs would re-register and restart their work.

Bandwidth Negotiation

In one or more embodiments, individual PALs utilize bandwidth for transferring data and bandwidth allocations are divided into two classes: Critical BW and Varying BW. Critical BW refers to reservations that a PAL needs to function well. Varying BW, on the other hand, refers to reservations in addition to Critical reservations that the PAL can use for improving its data transfers.

In one or more embodiments, before the PAL can request BW from the URCD, it creates a Bandwidth Group that defines the (Owner, Target, StreamIndex, ReservationType). After it has created the Bandwidth Group, the PAL can create Bandwidth that is associated with a BW Group.

In connection with bandwidth negotiation activities, the following functions can be used:

BWGroupCreate

This function can be used if a PAL needs bandwidth from the URCD. The PAL first creates a bandwidth group. A bandwidth group defines the (Target Device Address, Stream Index, and Reservation Type). Once a bandwidth group has been created, the PAL may create and reserve several bandwidth components to get the required bandwidth.

Arguments:

a. PalHandle: The handle to the PAL received when the PAL registered with the URCD.

b. TargetDeviceAddress: The target device address c. Stream Index: Stream Index d. Reservation Type: The reservation type needed (as per defined by the DRP IE in MAC Spec). Reservation Type cannot be 0 i.e. Type Alien BP.

e. DeviceAvailabilityMap: A bitmap informing the URCD about the device availability information. The URCD will cache this information, and the PAL tells the URCD of any updates to this information. The URCD provides this information if and only if it sets the FLAG URCD_DEVICE-AVAILABILITY_INFO_BY_PAL flag f. Flags:

i. Bit 0: It is a MultiCast Reservation (FLAG_URCD_MULTICAST)

ii. Bit 1: PAL will provide DeviceAvailabilityInfo iii. Bit 2: PAL will provide DeviceAvailabilityInfo for each Reservation Request.

iv. Rest bits are reserved for future use.

RULES: If bit 0 is set bit 1 or 2 must be set.

Both bit1 and bit2 must not be set.

g. CallbackOnChange: (Optional) If provided by the PAL, the URCD would call it to notify the PAL about any changes in the cumulative Mas slots allocated for all the reservations under this Bw Group.

```
NTSTATUS
BWGroupCreate(
    __in        PAL_HANDLE           PalHandle,
    __in        DEVADDR              TargetDeviceAddress,
    __in        BYTE                 StreamIndex,
    __in        BYTE                 ReservationType,
    __in_opt    PUWB_MAS_MAP         DeviceAvailability,
    __in        ULONG                Flags,
    __in_opt    PFN_URCD_CALLBACK_BW_GROUP_ALLOCATION_CHANGE
                                     CallbackOnChange,
    __in_opt    PVOID                ChangeContext,
    __out       BW_GROUP_HANDLE      *BWGroupHandle
);
```

The prototype is

```
VOID
CallbackOnChange (
    _in     PVOID                   ChangeContext,
    _in     PUWB_MAS_MAP            AllocatedMases,
    _in     UWB_BW_REQUEST_STATUS
                                    BwStatus,
    _in     PFN_URCD_BW_GROUP_ALLOCATION_CHANGE_COMPLETE
                                    ChangeComplete
);
ChangeContext - The ChangeContext that was passed in
the BWGroupCreate Function.
AllocatedMases - A bitmap of the current MASes
allocated for this request
BwStatus - Reason for calling this notification
callback.
ChangeComplete - A function that the PAL must call
back once is has successfully completed updating its
mases. The Protoype is:
VOID
ChangeComplete(
    _in     BW_GROUP_HANDLE         BWGroupHandle,
    _in     NTSTATUS                Status
);
``` h. ChangeContext: (Optional) An context that is passed in the above CallbackOnChange callback.

i. BwGroupHandle: Output: Handle to the BW Group.

Return Value:
STATUS—STATUS_INSUFFICIENT_RESOURCES if there is a low memory situation.

BWGroupReleaseandDeleteAllBw

```
VOID
BWGroupReleaseandDeleteAllBw (
    _in     BW_GROUP_HANDLE         BWGroupHandle,
    _in     PFN_URCD_BW_GROUP_CALLBACK_RELEASE_AND_DELETE_ALL
                                    CompletionOnReleaseAndDeleteAll,
    _in_opt PVOID                   ReleaseAndDeleteAllContext
);
```

This request tells the URCD to release and delete any Bandwidth components of this BW Group. In one or more embodiments, the PAL treats the BW_HANDLEs that are associated with the BW Group as destroyed as soon as this function is called and PAL may not use any such BW_HANDLE after issuing this call.

Arguments:

a. BWGroupHandle: The Handle of BW Group received on a call to BWGroupCreate b. CallbackOnReleaseAndDeleteAll: A callback provided by the PAL that the URCD calls when all the Bw components are released and deleted.

The prototype of the callback is

```
typedef
VOID
CallbackOnReleaseAndDeleteAll(
    _in     PVOID                   ReleaseAndDeleteContext
);
ReleaseAndDeleteContext - The Context that is passed
in the BWGroupReleaseAndDeleteAllBw function.
``` c. ReleaseAndDeleteContext: (optional) An optional context that for the CallbackOnReleaseAndDeleteAll callback described above Return Value:
NONE BWGroupDelete

```
VOID
BWGroupDelete(
    _in     BW_GROUP_HANDLE         BWGroupHandle
);
```

This request tells the URCD to delete the BW Header that was created during the BWGroupCreate call. It is to be noted that if the PAL has some BW that was reserved for the BW Group, the PAL first releases and deletes each of those BW requests, OR, the PAL calls BWGroupReleaseAndDeleteAllBw and waits for that request to complete before making a call to BWGroupDelete.

The PAL treats the BW_GROUP_HANDLE as destroyed as soon as this function is called and PAL may not use BW_GROUP_HANDLE after issuing this call.

Arguments:

a. BWGroupHandle: The Handle of BW Group received on a call to BWGroupCreate

Return Value:
NONE

BwGroupUpdateMasAvailability

```
VOID
BwGroupUpdateMasAvailability(
    _in     BW_GROUP_HANDLE         BWGroupHandle,
    _in     PUWB_MAS_MAP            MasAvailability
);
```

If the PAL provided a DeviceAvailability during the BWGroupCreate Call, it can update that Availability Info by calling this function.

Arguments:
a. BwGroupHandle: The Handle of BW Group received on a call to SetupReservationHeader
b. MasAvailability: A bitmap informing the URCD about the updated device availability information. The URCD will cache this information.
Return Value:
   NONE
BWCreate

```
typedef
NTSTATUS
BWCreate (
    __in    BW_GROUP_HANDLE    BWGroupHandle,
    __out   BW_HANDLE          *BWHandle
);
```

This routine allows the PAL to create a BW Component for a BW Group it had created earlier.
Arguments:
a. BWGroupHandle: The handle to the BWGroup that was received on the call to BWGroupCreate.
b. BwHandle: Output: Handle to the BW Component.
Return Value:
   STATUS—STATUS_INSUFFICIENT_RESOURCES if we are in low memory situation.
CriticalBWReserve

```
typedef
NTSTATUS
CriticalBWReserve (
    __in       BW_HANDLE                          BWHandle,
    __in       UWB_BW_INTERVAL                    Interval,
    __in       USHORT                             Time,
    __in_opt   PUWB_MAS_MAP                       DeviceAvailability,
    __in       ULONG                              Flags,
    __in       PFN_URCD_CALLBACK_BW_RESERVE       CallbackOnReserve,
    __in_opt   PVOID                              ReserveContext,
    __in_opt   PFN_URCD_CALLBACK_BW_ALLOCATION_CHANGE
                                                  CallbackOnChange,
    __in_opt   PVOID                              ChangeContext
);
```

After the PAL has create a BW Handle, the PAL uses this routine to request Critical BW.
Arguments:
a. BwHandle: The Handle of BW received on a call to BWCreate
b. Interval: The Periodicity of the needed BW.
c. Time: Number of micro-seconds needed per Zone.
   Valid Values are: 1 to 256 OR in multiples of 256.
d. MasAvailabilityMap: A bitmap informing the URCD about the MAS availability information. The URCD would allocation bw only out of this availability information. The URCD will cache this information, and the PAL then tells the URCD of any updates to this information. The URCD provides this information if and only if it set the Flags bit when it called the BwGroupCreate
e. Flags: Reserved for future.
f. CallbackOnReserve: The URCD would call it to notify the PAL whether it was able to reserve the Critical BW for the PAL. The prototype is

```
VOID
CallbackOnReserve(
    __in_opt   PVOID      ReserveContext,
    __in       BOOLEAN    Success
);
```
ReserveContext - The context that is passed in the CriticalBWReserve function
Success - If TRUE means that bandwidth was reserved successfully. Else it means that the bandwidth could not be reserved.

Note:
If Success is TRUE, the CallbackOnChange would be called to notify the PAL about what Mases were allocated.

g. ReserveContext: (Optional) Context to be passed in CallbackOnReserve callback.
h. CallbackOnChange: (Optional) If provided by the PAL, the URCD would call it to notify the PAL about any changes in the Mas slots allocated.
The prototype is

```
VOID
CallbackOnChange(
    __in_opt   PVOID                   ChangeContext,
    __in       PUWB_MAS_MAP            AllocatedMases,
    __in       UWB_BW_REQUEST_STATUS   BwStatus,
    __in       PFN_URCD_BW_ALLOCATION_CHANGE_COMPLETE
                                       ChangeComplete
);
```
ChangeContext - The ChangeContext that was passed in the CriticalBWReserve Function.
AllocatedMases - A bitmap of the current MASes allocated for this request
BwStatus - Reason for calling this notification callback.
ChangeComplete - A function that the PAL calls back once it has successfully completed updating its mases. The Prototype is:
```
VOID
ChangeComplete(
    __in   BW_HANDLE   BWHandle,
    __in   NTSTATUS    Status
);
``` i. ChangeContext: The context that is passed in the CallbackOnChange callback.
Return Value:
   STATUS—STATUS_INSUFFICIENT_RESOURCES if we are in low memory situation.
VaringBWReserve

```
typedef
NTSTATUS
VaryingBWReserve (
    __in       BW_HANDLE             BWHandle,
    __in       UWB_BW_INTERVAL       Interval,
    __in       USHORT                Time,
    __in_opt   PUWB_MAS_MAP          DeviceAvailability,
    __in       ULONG                 Flags,
    __in_opt   PFN_URCD_CALLBACK_BW_ALLOCATION_CHANGE
                                     CallbackOnChange,
    __in_opt   PVOID                 ChangeContext,
    __in       PULONG                ByteTransferCounter
);
```

After the PAL has setup a BW Header, the PAL uses this routine to request a Varying BW.
Arguments:
a. BwHandle: The Handle of BW received on a call to BWCreate b. Interval: (Optional meant as a Suggestion to URCD) The Periodicity of the needed BW. Set to UWB_BW_INTERVAL_DONT_CARE if the PAL does not care.
c. Time: (Optional meant as a Suggestion to the URCD) Number of micro-seconds needed per Zone. (Set to 0 if PAL does not care)
Valid Values are: 0, OR multiples of 256.
d. MasAvailabilityMap: A bitmap informing the URCD about the MAS availability information. The URCD would allocation BW only out of this availability information. The URCD will cache this information, and the PAL tells the URCD of any updates to this information. The URCD provides this information if and only if it set the Flags bit in when it called the BwGroupCreate
e. Flags: Reserved for future.
f. CallbackOnChange: (Optional) If provided by the PAL, the URCD would call it to notify the PAL about any changes in the Mas slots allocated.

The prototype is

```
VOID
CallbackOnChange(
    __in_opt  PVOID                    ChangeContext,
    __in      PUWB_MAS_MAP             AllocatedMases,
    __in      UWB_BW_REQUEST_STATUS    BwStatus,
    __in      PFN_URCD_BW_ALLOCATION_CHANGE_COMPLETE  ChangeComplete
);
ChangeContext - The ChangeContext that was passed in
the VaryingBWReserve Function.
AllocatedMases - A bitmap of the current MASes
allocated for this request
BwStatus - Reason for calling this notification
callback.
VOID
ChangeComplete(
    __in  BW_HANDLE   BWHandle,
    __in  NTSTATUS    Status
);
``` g. ChangeContext: The context that is passed in the CallbackOnChange callback.
h. BytesTransferredCounter: A pointer to a counter that keeps track of the number of bytes transferred. The PAL keeps this counter updated. URCD will look at the contents of this counter to adjust bandwidth for this request.

Return Value:
  STATUS—STATUS_INSUFFICIENT_RESOURCES if we are in low memory situation.

BWRelease

```
VOID
BWRelease(
    __in      BW_HANDLE                   BWHandle,
    __in      PFN_URCD_CALLBACK_BW_RELEASE  CallbackOnRelease,
    __in_opt  PVOID                       ReleaseContext
);
```

This request tells the URCD to release the BW reservation.
Arguments:
a. BWHandle: The Handle of BW Group received on a call to BWCreate
b. CallbackOnRelease: A callback provided by the PAL that the URCD calls when the BW is released

```
VOID
CallbackOnRelease(
    __in_opt  PVOID   ReleaseContext
);
ReleaseContext - The ReleaseContext that was passed
in the BWRelease function.
``` c. ReleaseContext: A context that is passed in when the CallbackOnRelease callback is called.

Note:
After the CallbackOnRelease has been called, the PAL may reuse the BW_HANDLE to send a new BwReserve request to the URCD.

Return Value:
  NONE

BWDelete

```
VOID
BWDelete(
    __in  BW_HANDLE   BWHandle
);
```

This request tells the URCD to delete the BW that was created during the BWCreate. It should be noted that if this BW_HANDLE was used in a call to CriticalBWReserve or VaryingBWReserve call, the PAL first releases that BW by calling the BWRelease function. Further, the PAL treats that BW_HANDLE as destroyed as soon as this function is called and the PAL may not use BW_HANDLE after issuing this call.

Arguments:
a. BWHandle: The Handle of BW received on a call to BWCreate

Return Value:
  NONE

VOID VaryingBWInitiateAutoAdjust(

```
typedef
VOID
(*PFN_URCD_VARYING_BW_INITIATE_AUTO_ADJUST) (
    __in  BW_HANDLE  BWHandle,
    __in  ULONG      Time
);
```

This request tells the URCD to start adjusting the Varying BW.

Arguments:
a. BWHandle: The Handle of BW received on a call to BWCreate
b. Time: Reserved Return Value:
  NONE BWUpdateMasAvailability

```
VOID
BWUpdateMasAvailability (
    __in  BW_HANDLE     BWHandle,
    __in  PUWB_MAS_MAP  MasAvailability
);
```

If the PAL provided AvailabilityInfo during Allocate BW Call, it can update that Availability Info by calling this function.

Arguments:
a. BwHandle: The Handle of BW request
b. DeviceAvailabilityMap: A bitmap informing the URCD about the updated device availability information. The URCD will cache this information.

Return Value:
NONE

Consider now some implementation considerations concerning bandwidth negotiation in accordance with one or more embodiments. In one or more embodiments, to be able to reserve any BW, the user should have: a BW group (created earlier by BWGroupCreate) and a BW component (created earlier by BWCreate). In the above-described embodiment, two types of BW can be reserved: Critical and Varying (CriticalBWReserve, VaryingBWReserve). Further, multiple BW components can belong to the same group. In addition, in at least some embodiments, Reserve may be called only once for each BW component, unless the previous Reserve was released (BWRelease) or Reserve failed (in case of critical). For example, a BW component may be used again to reserve another BW, once it has been released. Further, if the BW was reserved, in at least some embodiments, it must be released before it can be deleted. In addition, in at least some embodiments, Release BW for critical BW should only be called if the reserve completion routine returned success. Lastly, in at least some embodiments, all BW handles (belonging to a BW group) must be deleted before that BW group can be deleted.

Figure 5:
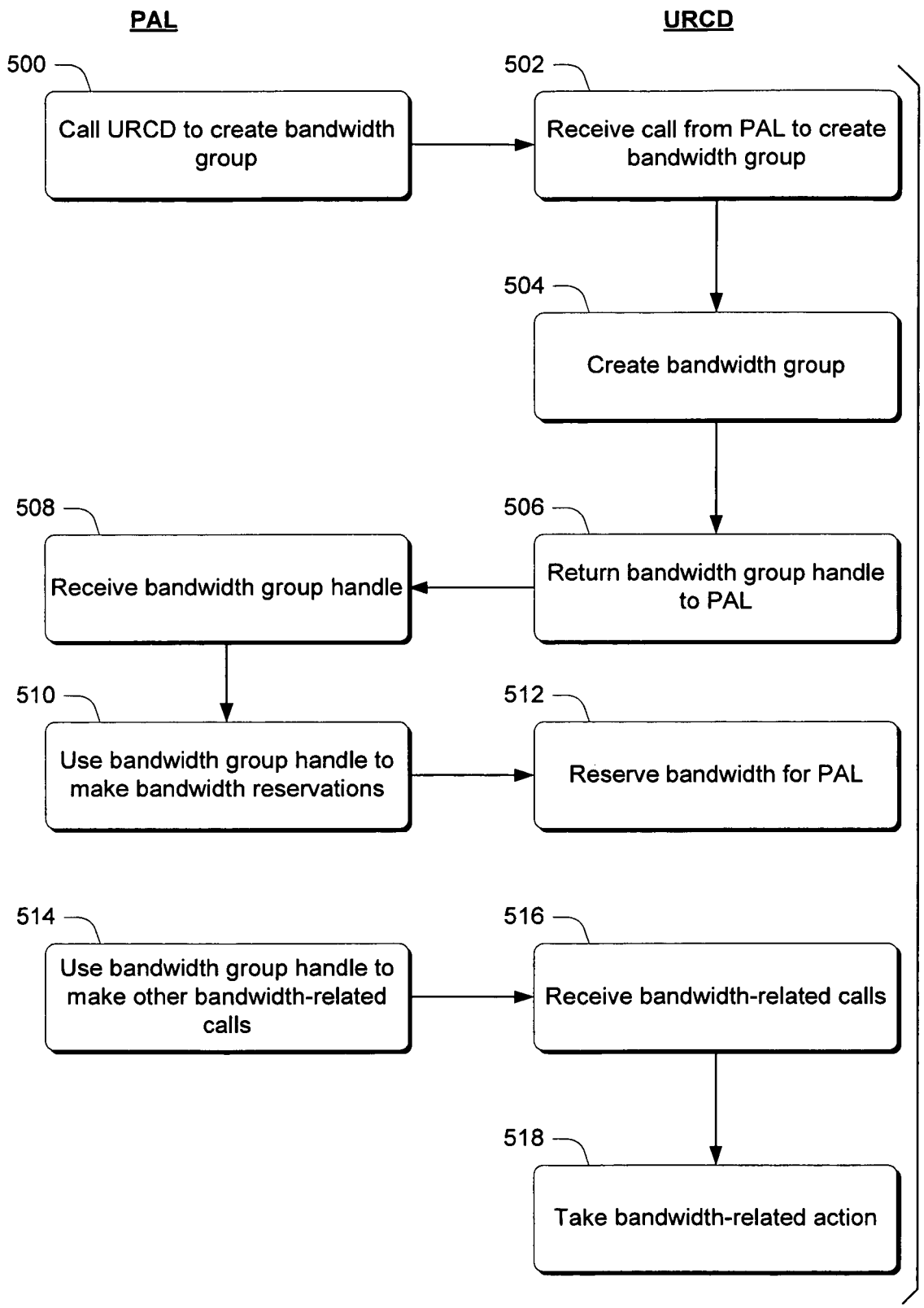
FIG. 5 is a flow diagram that describes steps in a method in accordance with one or more embodiments.

FIG. 5 is a flow diagram that describes steps in a process for handling bandwidth in accordance with one or more embodiments. The steps can be implemented in connection with any suitable hardware, software, firmware or combination thereof. In at least some embodiments, the method can be implemented in software by, for example, a driver architecture such as the one described above. In the illustrated example, the flow diagram is divided into two portions—one designated "PAL" to depict acts performed by a PAL, and another designated "URCD" to depict acts performed by a URCD.

Step 500 calls the URCD to create a bandwidth group. An example of how this can be done is provided above. Step 502 receives the call from the PAL to create a bandwidth group and step 504 creates a bandwidth group. Step 506 then returns a bandwidth group handle to the PAL.

Step 508 receives the bandwidth group handle and step 510 uses the bandwidth group handle to make bandwidth reservations. Step 512 reserves bandwidth for the PAL using the bandwidth group handle. A handle to the reserved bandwidth is also passed back to the PAL.

Step 514 uses the bandwidth group handle (or the handle to the reserved bandwidth) to make other bandwidth-related calls. Examples of other bandwidth-related calls are given above. Step 516 receives the bandwidth related calls and step 518 takes a bandwidth-related action. Examples of bandwidth-related actions are provided above.

URC Info

In one or embodiments, various functions can be provided to handle URC information. By way of example and not limitation, these functions can include the following:

GetPhyCapablityBitmap

```
VOID
GetPhyCapabilityBitmap(
    __in    PAL_HANDLE          PalHandle,
    __out   PPHY_CAP_BITMAP     PhyCapBitmap
)
```

Arguments:
a. Pal: The handle to the PAL received when the PAL registered with the URCD.
b. PhyCapabilityBitmap: (Output): The Phy Capability Bitmap as defined in the Phy Capabilities IE in the MAC spec.

GetMacCapabilityBitmap

```
VOID
GetMacCapabilityBitmap(
    __in    PAL_HANDLE          PalHandle,
    __out   PMAC_CAP_BITMAP     MacCapBitmap
)
```

Arguments:
a. Pal: The handle to the PAL received when the PAL registered with the URCD.
b. MacCapabilityBitmap: (Output): The MAC Capability Bitmap as defined in the MAC Capabilities IE in the MAC spec.

GetDevAddress

```
VOID
GetDevAddress(
    __in    PAL_HANDLE    PalHandle,
    __out   PUSHORT       Address
);
```

Arguments:
a. Pal: The handle to the PAL received when the PAL registered with the URCD.
b. DevAddress: (Output): 16 bit device address.

GetMacAddress

```
VOID
GetMacAddress(
    __in    PAL_HANDLE          PalHandle,
    __out   PULONGLONG          MacAddress,
    __out   PURC_PROP_STATE     MacAddrState
);
```

Arguments:
a. Pal: The handle to the PAL received when the PAL registered with the URCD.
b. MacAddress: (Output): 48 bit MAC Address. MacAddrState: The current state of the 48 bit MAC address being returned.

Channel Manager

In one or embodiments, various functions can be provided to handle channel management activities. By way of example and not limitation, these functions can include the following:

SetChannelBitMask

```
NTSTATUS
SetChannelBitMask (
    __in    PAL_HANDLE        PalHandle,
    __in    CHANNEL_BITMAP    NewMask
);
```

In one or more embodiments, by default, all of the channels that are supported by the URC are also supported by the PALs. Assume, for example, that a PAL (such as WUSB) is connected to a device that supports only certain channels.

This function allows the PAL to tell the URCD to only use certain channels. This information may be useful to the URCD's Channel Manager if some other PAL requests to change to a channel not supported by the PAL. In at least some embodiments, less than all of the channels can be supported. For example, in certain regions, less than all of the channels might be supported because of regulatory issues.

Arguments:
a. Pal: The handle to the PAL received when the PAL registered with the URCD.
b. ChannelBitMask: each bit represents a UWB channel.

Return Value:
STATUS_SUCCESS if URCD is able to satisfy this new channel mask. If it cannot satisfy this new mask, it will return STATUS_NOT_FOUND.

StartChannel

```
VOID
StartChannel(
    _in         PAL_HANDLE      PalHandle,
    _in_opt     PCHANNEL_BITMAP Mask,
    _in_opt     PFN_URCD_START_CHANNEL_COMPLETION
                                StartChannelCompletion,
    _in         PVOID           Context
)
```

In one or more embodiments, when a PAL wants to start a channel, it lets the URCD know by calling this function. The URCD will then call the completion routine when it has finished starting the channel.

Arguments:
a. PalHandle: Pal Handle
b. Mask(Optional): This is a pointer to the channel bit mask indicating the channels that PAL can work with. If none has been specified—then it assumed that PAL can work with any channel. This mask can be later changed by the PAL using SetChannelBitMask function.
c. StartChannelCompletion: (Optional) If provided by the PAL, the URCD would call it to notify the PAL that it has finished processing its request.

The prototype is

```
VOID
StartChannelCompletion(
    _in         UCHAR       Channel,
    _in_opt     PVOID       Context
)
Channel - The channel that URC chose to beacon on.
Context - The Context that was passed in the
StartChannel Function.
``` d. Context: The context that is passed in the StartChannelCompletion callback.

Return Value:
VOID

StopChannel

```
VOID
StopChannel(
    _in         PAL_HANDLE      PalHandle,
    _in_opt     PFN_URCD_STOP_CHANNEL_COMPLETION
                                StopChannelCompletion,
    _in         PVOID           Context
)
```

In one or more embodiments, when a PAL wants to stop a channel, it uses this function to let the URCD know about it. Before the PAL calls this function, it should have released and deleted all bandwidth objects. It should also have removed all the IEs and ASIEs that it might have added.

Arguments:
a. PalHandle: Pal Handle
b. StopChannelCompletion: (Optional) If provided by the PAL, the URCD would call it to notify the PAL that it has finished processing the request. After this completion routine is called, PAL can assume that URC is not going to make any channel related calls into PAL like "ChangeChannel", etc.

The prototype is

```
VOID
StopChannelCompletion(
    _in_opt     PVOID       Context
)
Context - The Context that was passed in the
StopChannel Function.
``` c. Context: The context that is passed in the StopChannelCompletion callback.

Return Value:
VOID

ScanAllChannels

```
VOID
ScanAllChannels(
    _in         PAL_HANDLE  PalHandle,
    _in         BOOLEAN     Aggressive
)
```

This command starts a Scan for all channels.

Arguments:
a. Pal: The handle to the PAL received when the PAL registered with the URCD.
b. Aggressive: If this bit is not set, a scan is done while INACTIVE. If this bit is set QOS reservations are preserved, and other reservations are relinquished whereafter a SCAN_WHILE_INACTIVE is performed.

Consider now some usage notes for the channel management functions in accordance with one or more embodiments. First, a PAL should not call StartChannel more than once before calling StopChannel in between. In at least some embodiments, there should be one stop channel for a start channel. In addition, SetChannelBitMask can be called any time. If called after startchannel, then it might result in a channel change (e.g., the PAL will get a notification for that, if it has provided a ChannelChange function). Finally, before changing channels, the URC calls PrepareStopChannel (if they have provided one) to the PALS which they use to complete (through a completion routine) before the URC actually changes channels.

Having considered some example functions associated with channel management activities, consider now a few miscellaneous functions.

Miscellaneous

VendorSpecificCommand

```
VOID
VendorSpecificCommand(
    _in         PAL_HANDLE  PalHandle,
    _in         ULONG       Length,
    _in_bcount(Length)
```

```
            PVOID          Command,
    _in     PFN_URCD_VENDOR_CMD_COMPLETION
                           Completion,
    _in_opt PVOID          Context
);
```

This function allows Vendor Specific commands to be issued by the PAL to the URC. Thus, this function can facilitate extensibility of the overall system.
Arguments:
a. Length: Length in bytes of the RCCB Buffer
b. Command: Pointer to the RCCB structure defined in the WHCI Spec. The RCCB.CommandContextID should be 0; URCD would fill that value in before sending it to the hardware.
c. Context: PALs Context for passing in the Callback.
d. Callback: A callback routine implemented by the PAL of the prototype:

```
        VOID
        CompletionCallback(
            _in      NTSTATUS  Status,
            _in      PVOID     EventBlock,
            _in_opt  PVOID     Context
        )
```

Status: Status returned by the software indicating whether the command was successfully sent or not
EventBlock: RCEB returned by the hardware, in response to the command
Context: Context that passed in the VendorSpecificCommand function
AcquireTKID

```
        ULONG
        AcquireTKID(
            _in     PAL_HANDLE     PalHandle
        );
```

This generates a TKID which is unique across all PALs.
Arguments:
Return Value:
    The generated TKID
ReleaseTKID

```
        VOID
        ReleaseTKID(
            _in    PAL_HANDLE    PalHandle,
            _in    ULONG         Tkid
        );
```

This releases a TKID earlier acquired by the PAL.
Arguments:
    a. TKID: The TKID to be released.
Having considered various aspects of a URCD-PAL interface, consider now a discussion of various power management features, including various functions associated with power management.
Power Management
In one or more embodiments, a PAL can decide to go to an idle state based on its own idle heuristics. If the PAL will not be using any bandwidth while idle, then it can let the URC know about it so that the URC can conserve power by going to its own idle state or altogether stop beaconing. When the PAL is in the idle state, it can also decide to go to a lower power device state. A PAL can also go to such a state in response to a system wide sleep state transition. Before going to such a state, a PAL notifies the URC.

In at least some embodiments, the URC does not initiate a sleep on its own. It follows the idle states of its PALs. The URC device stack follows the device state of the PAL stacks.

In at least some embodiments, a PAL can choose to arm itself for remote wake from its devices. For remote wake to work, the PAL can come up periodically and ask for device notifications. In order to do this, PALSs use some bandwidth. PALs are responsible for reserving this bandwidth before they go to sleep. The URC (and URCD) are responsible for maintaining this remote wake bandwidth, regardless of its own sleep state. A PAL should be prepared to handle bandwidth allocation changes while sleeping.

In at least some embodiments, PALs also inform the URCD about its remote wake polling interval and also how long will it need the channel in each sleep cycle. Since the URCD manages multiple PALs, the URCD might override these values and send them back to the PAL.

While a PAL is sleeping, the URCD will continue to give all the notifications to the PAL driver as usual. It is up to the PAL driver to decide whether to buffer that notification or process it. One exception is remote wake bandwidth allocation change notification which PALs process.

When a bandwidth conflict occurs, the URCD might have to send multiple bandwidth allocation change notifications to the PAL to resolve it. Since it is possible that the PAL might temporarily wake up its hardware to process these bandwidth changes, it is undesirable for the PAL to wake up for each of these notifications. To overcome this problem, in at least some embodiments, the URCD provides two additional notifications, which the PAL provides during initial registration: PrepareForRemoteWakeBwChanges and NoMoreRemoteWakeBwChanges. When the PAL receives the PrepareForRemoteWakeBwChanges notification, it should do whatever is necessary to process the bandwidth changes (e.g., wake up its hardware) before calling the completion routine. When PAL receives the NoMoreRemoteWakeBwChanges, it can safely go back to the previous state.

In at least some embodiments, a PAL will also consider synchronization issues that might arise because of the various independent events overlapping with each other, e.g., the URCD giving bandwidth allocation change notifications and the PAL getting a wake signal (either from the hardware or from software). In order to assist PALs, the URCD can serialize the processing of Remote wake BW change notifications and ResumeChannel Calls so that if a PAL calls ResumeChannel while a Bandwidth Allocation Change is in progress, the URCD will not call the completion routine for the ResumeChannel call until the current BW allocation change process completes i.e. it receives a CompletionCallback for NoMoreRemoteWakeBwChanges from the PAL.

Consider now some various functions associated with power management activities.
SleepChannel

```
        VOID
        SleepChannel(
            _in      PAL_HANDLE    PalHandle,
            _in_opt  PFN_URCD_SLEEP_CHANNEL_COMPLETION
                                    SleepChannelCompletion,
```

-continued

```
    __in       PVOID              Context
)
```

When the PAL has gone to sleep, it lets URCD know by calling this function.
Arguments:
a. PalHandle: Pal Handle
b. SleepChannelCompletion: (Optional) If provided by the PAL, the URCD would call it to notify the PAL that it has finished processing its request.
The prototype is

```
VOID
SleepChannelCompletion(
    __in_opt    PVOID           Context
)
Context - The Context that was passed in the
SleepChannel Function.
``` c. Context: The context that is passed in the SleepChannelCompletion callback.
Return Value:
  VOID
ResumeChannel

```
VOID
ResumeChannel(
    __in       PAL_HANDLE   PalHandle,
    __in_opt   PFN_URCD_RESUME_CHANNEL_COMPLETION
                            ResumeChannelCompletion,
    __in       PVOID              Context
)
```

When a PAL wants to resume from a channel, it uses this function to make sure the URC is awake.
Arguments:
a. PalHandle: Pal Handle
b. ResumeChannelCompletion: (Optional) If provided by the PAL, the URCD would call it to notify the PAL that it has finished waking up URC
The prototype is

```
VOID
ResumeChannelCompletion(
    __in_opt    PVOID           Context
)
Context - The Context that was passed in the
ResumeChannel Function.
``` c. Context: The context that is passed in the ResumeChannelCompletion callback.
Return Value:
  VOID
RemoteWakeBWReserve

```
NTSTATUS
    __in       BW_HANDLE        BWHandle,
    __in       UWB_BW_INTERVAL  Interval,
    __in       USHORT           Time,
    __in_opt   PUWB_MAS_MAP     DeviceAvailability,
    __in       ULONG            Flags,
    __in       PFN_URCD_CALLBACK_BW_RESERVE
                                CallbackOnReserve,
    __in_opt   PVOID            ReserveContext,
    __in_opt   PFN_URCD_CALLBACK_BW_ALLOCATION_CHANGE
                                CallbackOnChange,
    __in_opt   PVOID            ChangeContext
);
```

A Pal uses this function to reserve bandwidth required for supporting remote wake. The meaning of the parameters and return value is the same as the CriticalBWReserve function. When the PAL gets CallbackOnChange for such bandwidth, the PAL might have to wake itself, deal with the change and then go back to sleep. The PAL should call the completion routine for the CallBackOnChange routine when all these steps have been completed.
RemoteWakeSetParameters

```
NTSTATUS
RemoteWakeSetParameters(
    __in       PAL_HANDLE   PalHandle,
    __in_out   PULONG       RemoteWakePollInterval,
    __in_out   PULONG       RemoteWakePollActivePeriod
)
```

A PAL uses this function to tell the URCD about its remote wake requirements before it goes to sleep so that when the URCD sends the URC to sleep, it can make sure that URC wakes up periodically and keep the channel awake as per the PAL's requirements.
Arguments:
a. PalHandle: Pal handle.
  b. RemoteWakePollInterval: This is the period in units of superframes after which PAL regularly wakes up and looks for wake notifications. PAL gives this parameter as input but URC might return a different value which will be less than equal to the original parameter specified by the PAL.
  c. RemoteWakePollActivePeriod—This is the period, in units of superframes, for which PAL needs to be awake after each RemoteWakePollInterval. PAL gives this parameter as input but URC might return a different value which will be less than equal to the original parameter specified by the PAL.
Return Value:
  STATUS—URCD returns STATUS_INVALID PARAMETER if it cannot satisfy PAL's requirements, otherwise returns STATUS_SUCCESS.

Having considered various power management functions, consider now some usage notes for the power management functions in accordance with one or more embodiments.

The following is a sequence of operations that will typically be used by a PAL for sleeping when it detects that it is idle. First, all bandwidth is released and a request is made for remote wake bandwidth. Remote wake parameters are set and modified parameters returned from the URCD are stored. Next, the associated hardware for remote wake is programmed and then sent to sleep. Next, the URC is notified by calling SleepChannel.

While sleeping, if a PrepareForRemoteWakeBwChanges.call is received, it is processed in the following way. First, the hardware is awakened and the completion routine is called for PrepareForRemoteWakeBwChanges. Next, a bandwidth allocation change notification is acquired from the PAL and the associated hardware is re-programmed with the new allocation. Bandwidth allocation change notifications and associated hardware re-programming are performed until the URCD calls NoMoreRemoteWakeBwChanges. At this point, the hardware is sent back to sleep and the completion routine is called for NoMoreRemoteWakeBwChanges.

While sleeping, if a remote wake signal is received, it is processed in the following way. First, the signal is verified to ensure that is was generated by the associated hardware. If it was not, then the signal is ignored. If it was generated by the associated hardware, then ResumeChannel is called and the system waits for its completion. Once the URCD has called ResumeChannelCompletion, then the associated hardware is awakened and the remote wake bandwidth is released. Normal functioning can now resume.

Example System

Figure 6:
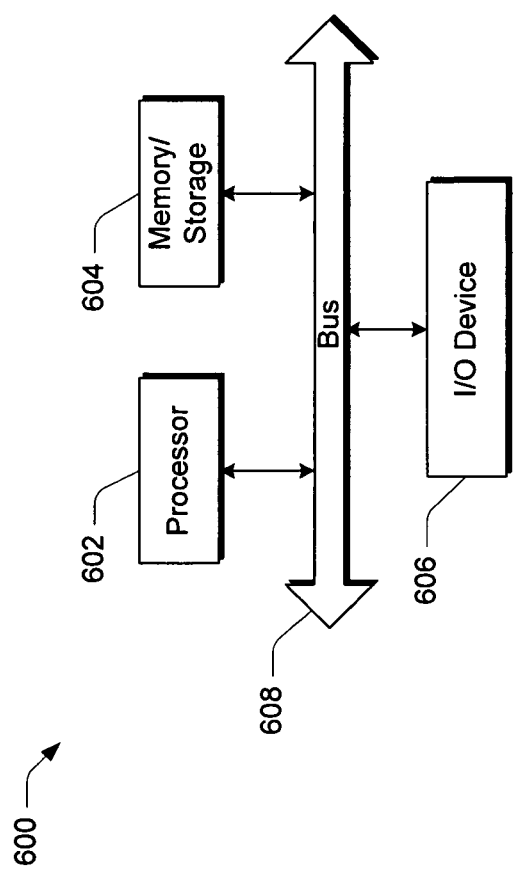
FIG. 6 is a block diagram of a system in accordance with one or more embodiments.

FIG. 6 illustrates an example computing device 600 that can implement the various embodiments described above. Computing device 600 can be, for example, computing device 102 of FIG. 1 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a two-way interface between a URC driver ("URCD") and various Protocol Adaption Layer (PAL) drivers. The two-way interface can enable bandwidth to be shared and managed among multiple different PALs. The two-way interface can also be used to implement common radio functionality such as beaconing, channel selection, and address conflict resolution. In at least some embodiments, the two-way interface can be utilized for power management to place PALs in lower power states to conserve power and to support remote wake-up functionality. Further, at least some embodiments can enable vendor-specific PALs to interact with vendor-specific hardware.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter

What is claimed is:

1. One or more computer-readable hardware storage memories embodying computer-readable instructions which, when executed, provide a software architecture comprising:
   an interface configured to enable two-way communication between at least one protocol adaption layer (PAL) driver and an Ultra-Wideband radio control driver (URCD);
   wherein the interface comprises:
      one or more channel management functions to enable channel management activities;
      bandwidth negotiation functions to enable the at least one PAL driver to:
         determine that a first bandwidth and additional varying bandwidth reservations are to be negotiated;
         create a Bandwidth Group that defines an Owner, Target, StreamIndex and ReservationType;
      make the first bandwidth and additional varying bandwidth reservations through the URCD; and
      communicate with the URCD to adjust bandwidth.

2. The one or more computer-readable hardware storage memories of claim 1, wherein said at least one PAL driver is associated with wireless Universal Serial Bus (USB) technology.

3. The one or more computer-readable hardware storage memories of claim 1, wherein said at least one PAL driver is associated with a bus technology other than wireless USB bus technology.

4. The one or more computer-readable hardware storage memories of claim 1, wherein said at least one PAL driver comprises multiple different PAL drivers, at least one of which is associated with wireless USB bus technology and at least one other of which is associated with a bus technology other than wireless USB bus technology.

5. The one or more computer-readable hardware storage memories of claim 1, wherein the interface further comprises one or more PAL registration functions to enable the at least one PAL to register for notifications.

6. The one or more computer-readable hardware storage memories of claim 5, wherein said notifications comprise notifications associated with one or more of: beacon notifications, Information Element (IE) notifications, Application Specific Information Element (ASIE) notifications, address change notifications, channel change notifications, vendor specific event notifications, command frame notifications, or bandwidth-associated notifications.

7. The one or more computer-readable hardware storage memories of claim 1, wherein the interface further comprises one or more power management functions to enable power management activities.

8. The one or more computer-readable hardware storage memories of claim 7, wherein one of the power management functions to enable power management activities comprises a power management function to enable the at least one PAL to inform the URCD of remote wake parameters.

9. The one or more computer-readable hardware storage memories of claim 8, wherein the one or more power management functions to enable power management activities further comprise one or more of:
a sleep channel function,
a resume channel function, or
a remote wake bandwidth reserve function.

10. The one or more computer-readable hardware storage memories of claim 1, wherein the bandwidth negotiation functions further comprise one or more of: a bandwidth group release and delete function, a bandwidth group delete function, a bandwidth group update Media Access Slot (MAS) availability function, a bandwidth create function, a bandwidth release function, a bandwidth delete function, or a bandwidth update MAS availability function.

11. The one or more computer-readable hardware storage memories of claim 1, wherein said one or more channel management functions to enable channel management activities comprise one or more of: a set channel bit mask function, a start channel function, a stop channel function, or a scan all channels function.

12. The one or more computer-readable hardware storage memories of claim 1, wherein said interface further comprises one or more of: a vendor specific command function, an acquire Temporal Key Identifier (TKID) function, or a release TKID function.

13. One or more computer-readable hardware storage memories embodying computer-readable instructions which, when executed, provide an application program interface comprising:
a plurality of functions to enable two-way communication between multiple different protocol adaption layer (PAL) drivers and an Ultra-Wideband radio control driver (URCD), wherein the plurality of functions comprise:
one or more bandwidth negotiation functions associated with:
determining that a first bandwidth and additional varying bandwidth reservations are to be negotiated; and
enabling at least one PAL driver to create a Bandwidth Group that defines an Owner, Target, StreamIndex and ReservationType, and make the first bandwidth and additional varying bandwidth reservations through the URCD;
one or more PAL registration functions associated with PAL registration or unregistration;
one or more notification registration functions associated with notification registration;
one or more Information Elements (IEs) or Application Specific Information Elements (ASIEs) functions associated with IEs or ASIEs;
one or more Ultra-Wideband Radio Control (URC) functions associated with URC information;
one or more channel management functions associated with channel management activities; and
one or more power management functions associated with power management activities.

14. The one or more computer-readable hardware storage memories of claim 13, wherein the one or more notification registration functions associated with notification registration comprise:
a register for beacon notification function,
an unregister for beacon notification function,
a register for IE notification function,
a register for ASIE notification function,
an unregister for ASIE notification function,
an unregister for IE notification function,
an address change notification function,
a prepare channel change notification function,
a channel change notification function,
a vendor specific event notification function,
a command frame received notification function,
a prepare for remote wake bandwidth changes function, and
a no more remote wake bandwidth changes function.

15. The one or more computer-readable hardware storage memories of claim 13, wherein the one or more IEs or ASIEs functions associated with IEs or ASIEs comprise:
an add IE function,
a remove IE function, and
a remove all IE s function.

16. The one or more computer-readable hardware storage memories of claim 13, wherein the one or more bandwidth negotiation functions associated with bandwidth negotiation comprise:
a bandwidth group release and delete function,
a bandwidth group delete function,
a bandwidth group update Media Access Slot (MAS) availability function,
a bandwidth create function,
a bandwidth release function,
a plurality of functions to enable PAL drivers to make different types of bandwidth reservations through the URCD,
a bandwidth delete function,
a function to enable the URCD to adjust bandwidth, and
a bandwidth update MAS availability function.

17. The one or more computer-readable hardware storage memories of claim 13, wherein the one or more URC functions associated with URC information comprise:
a get physical capability bitmap function,
a get Medium Access Controller (MAC) capability bitmap function,
a get device address function, and
a get MAC address function.

18. The one or more computer-readable hardware storage memories of claim 13, wherein the one or more channel management functions associated with channel management activities comprise:
a set channel bit mask function,
a start channel function,
a stop channel function, and
a scan all channels function.

19. The one or more computer-readable hardware storage memories of claim 13, wherein said interface further comprises:
a vendor specific command function,
an acquire Temporal Key Identifier (TKID) function, and
a release TKID function.

20. The one or more computer-readable hardware storage memories of claim 13, wherein the one or more power management functions associated with power management activities comprise:
- a function to enable the PAL drivers to inform the URCD of remote wake parameters,
- a remote wake set parameters function,
- a sleep channel function,
- a resume channel function, and
- a remote wake bandwidth reserve function.

* * * * *